United States Patent
Gloss et al.

(10) Patent No.: US 10,563,834 B2
(45) Date of Patent: Feb. 18, 2020

(54) LIGHT GUIDING OPTICAL SYSTEM

(71) Applicant: Varroc Lighting Systems, s.r.o., Senov u Noveho Jicina (CZ)

(72) Inventors: Tomas Gloss, Vitkov (CZ); Ales Hendrych, Hostalkova (CZ)

(73) Assignee: Varroc Lighting Systems, s.r.o., Šenov u Nového Jičína (CZ)

( * ) Notice: Subject to any disclaimer, the term of this patent is extended or adjusted under 35 U.S.C. 154(b) by 0 days.

(21) Appl. No.: 16/176,700

(22) Filed: Oct. 31, 2018

(65) Prior Publication Data

US 2019/0128492 A1    May 2, 2019

(30) Foreign Application Priority Data

Nov. 1, 2017 (CZ) .................................... 2017-698

(51) Int. Cl.

| | |
|---|---|
| B60Q 1/00 | (2006.01) |
| F21S 41/24 | (2018.01) |
| F21S 43/245 | (2018.01) |
| F21S 43/247 | (2018.01) |
| F21S 43/243 | (2018.01) |
| F21S 43/251 | (2018.01) |
| F21S 43/237 | (2018.01) |
| F21V 8/00 | (2006.01) |
| F21S 41/32 | (2018.01) |

(Continued)

(52) U.S. Cl.
CPC ............ *F21S 41/24* (2018.01); *F21S 41/322* (2018.01); *F21S 43/237* (2018.01); *F21S 43/243* (2018.01); *F21S 43/245* (2018.01); *F21S 43/247* (2018.01); *F21S 43/251* (2018.01); *G02B 6/001* (2013.01); *G02B 6/12007* (2013.01); *G02B 6/1225* (2013.01)

(58) Field of Classification Search
None
See application file for complete search history.

(56) References Cited

U.S. PATENT DOCUMENTS

| | | | |
|---|---|---|---|
| 6,452,675 B1 * | 9/2002 | Muller | .................. G01J 3/0259 |
| | | | 356/328 |
| 7,548,670 B2 | 6/2009 | Ijzerman et al. | |

(Continued)

FOREIGN PATENT DOCUMENTS

| | | |
|---|---|---|
| CN | 206361642 | 7/2017 |
| WO | 2016070210 | 5/2016 |

OTHER PUBLICATIONS

Search Report for CZ Application No. PV 2017-698, dated Jul. 24, 2018.

*Primary Examiner* — Vip Patel
(74) *Attorney, Agent, or Firm* — JK Intellectual Property Law, PA (57) ABSTRACT

The invention relates to a light guiding optical system comprising at least two light guides (6, 7, 8), to which is assigned a light unit (9) with at least one source (91) of light. The inner light guide (6) is provided with an input surface (61) with which it is situated opposite the light unit (9) and is further is provided with a broken stepped transition surface (67), which comprises at least one decoupling surface (64) and at least one reflective surface (65), whereby the broken stepped transition surface (67) of the inner light guide (6) is associated with an input surface (77, 87) of a coupling light guide (7, 8) which comprises at least one coupling surface (71, 81).

16 Claims, 8 Drawing Sheets

(51) Int. Cl.
*G02B 6/12* (2006.01)
*G02B 6/122* (2006.01)

(56) References Cited

U.S. PATENT DOCUMENTS

| | | | |
|---|---|---|---|
| 8,888,343 B2* | 11/2014 | De Lamberterie | G02B 6/001 |
| | | | 362/511 |
| 10,047,924 B2 | 8/2018 | Faffelberger et al. | |
| 10,330,274 B2 | 6/2019 | Chen et al. | |
| 2016/0171159 A1 | 6/2016 | Smith | |
| 2019/0129310 A1* | 5/2019 | Fidric | G01S 7/4811 |

* cited by examiner

LIGHT GUIDING OPTICAL SYSTEM

CROSS-REFERENCE TO RELATED APPLICATIONS

This application claims benefit to Czech Patent Application Number PV 2017-698, filed Nov. 1, 2017, which is incorporated by reference herein in its entirety.

TECHNICAL FIELD

The invention falls within the field of motor vehicle lighting devices and relates to a light guiding optical system comprising a light guide assembly adapted to guide light emitted by a light source.

BACKGROUND

A common disadvantage of the known light guiding systems used for motor vehicle lighting devices is the fact that some of the light emitted by the light sources is either not used or the desired shape of the output surface of the light guide does not allow the effective use of the light emitted by the light source. In any case, this reduces the luminous efficiency of the light guiding system. Thus, in the field of the construction of light guides and light guiding systems, it has been a constant concern to propose solutions that will increase luminous efficiency and ensure the homogeneity of the output light beam.

Documents U.S. Pat. No. 6,766,078B, US20170038518A1, EP1085253A3, DE1990464464, EP1867913B1, US20060234612A1, US20150362660A1, WO2017068309A1, DE102005011760B4, DE4129094B4, US20070139955A1 disclose different solutions with two or more light guides in which it is impossible to provide direct or sufficient power supply to each of the light guides.

Patent application CZ 2016-176 discloses a lighting device which comprises a plurality of light sources to meet the output characteristics of two different signal functions. The individual signal functions are provided by means of two different light beams, namely a first light beam emitted by a first optical segment and a second light beam emitted respectively by a light guiding optical segment. The light guiding segment is realized as a flat-shaped light guide which is in its central part provided with a stepped surface, wherein reflective surfaces for directing the light rays already coupled in the desired direction alternate with the secondary input surfaces for coupling the light emitted by the first/another optical segment.

A common disadvantage of the above-mentioned solutions is the fact that they do not allow to provide indirect power supply to two or more light guides arranged in a row next to each other.

When the need arises to transmit light rays from a light source to different separate light guiding segments, one of the arrangements used today is, for example, the positioning of light guides immediately one behind the other, nevertheless, this poses higher demands for built-up space and also causes non-homogeneity of the illumination when viewed from directions other than the X-direction of the vehicle. Another solution commonly used is shaping the light guide with the power section bent so that the light guides can be situated next to each other. This solution, however, involves increased light loss in the shaped parts, since in most cases it is necessary to change the shape within very small distances and this leads to a considerable curvature of the light guide surface, where the light is no longer guided inside the light guide by means of the so-called total reflection, but it penetrates through the walls of the light guide outside the light guide. Another disadvantage is that the parts of the light guide shaped in this manner need to be masked by a cover mask because adjusting the illumination homogeneity is more difficult.

The present invention aims at solving the problem of ensuring effective power supply to different light guides in cases when there is a need to illuminate the area of a light function with required characteristic of the output light beam by means of two or more light guides, preferably located parallel to each other, whereby it is not possible to ensure direct (separate) power supply to each of the light guides, for example because of restricting built-up space, or because of the requirement to minimize the PCBs in the lighting device, etc.

SUMMARY

The above-mentioned aims of the invention are achieved by a light guiding optical system, whose principle consists in that an inner light guide is provided with an input surface which is arranged opposite a light unit and is further provided with a broken stepped transition surface which comprises at least one light decoupling surface and at least one reflective surface, whereby to the broken stepped transition surface of the inner light guide is assigned an input surface of a light coupling light guide which comprises at least one coupling surface.

The advantage of the present invention is that it allows to adjust in a defined manner the amount of the light transmitted from one common light source to individual light guides and at the same time it enables to adjust the light behaviour of the individual light guides, namely by means of flat surface distribution of the individual surface types within the total area of the input and/or output surface of each light guide and especially by means of the relative ratio of the area of the individual types of surfaces within the input and/or output surface of each light guide. Hence, the number of the individual types of surfaces and their area distribution determines the homogeneity of the light and the light robustness in the individual light guides.

DESCRIPTION OF DRAWINGS

The present invention will be described in greater detail with reference to examples of embodiment illustrated in the accompanying drawings wherein.

DETAILED DESCRIPTION

The invention will be described with reference to exemplary embodiments of a light guiding optical system, which is a part of a lighting device. The lighting device comprises a carrier case 1, which is provided with a through hole covered with a cover glass 2. The inner space between the walls of the carrier case 1 and the cover glass 2 constitutes an inner chamber 3 which accommodates an optical unit 4 which is adapted to produce and emit light for providing at least one light function.

Figure 1:
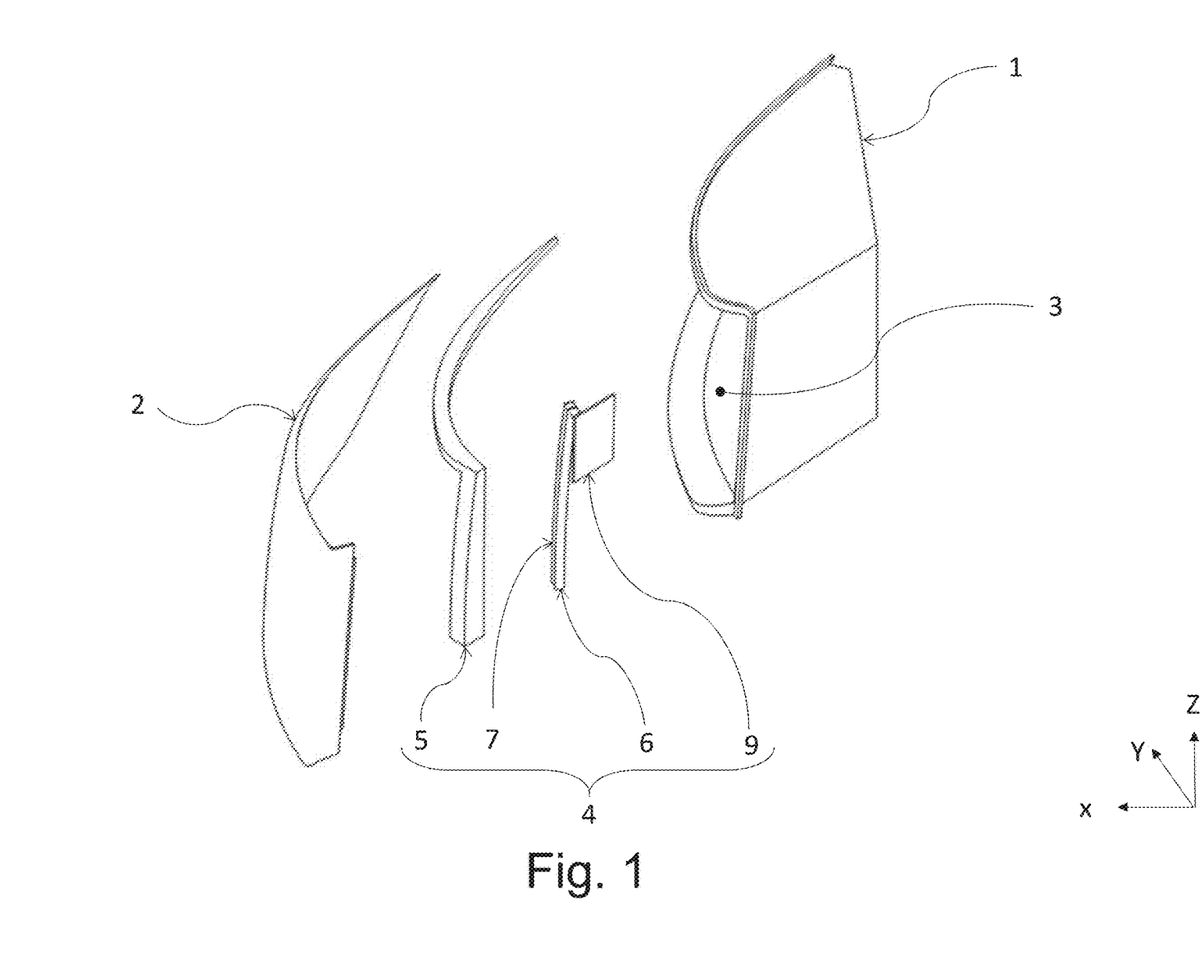
FIG. 1 is an exploded axonometric view of a first exemplary embodiment of the lighting device according to the invention.
Figure 2:
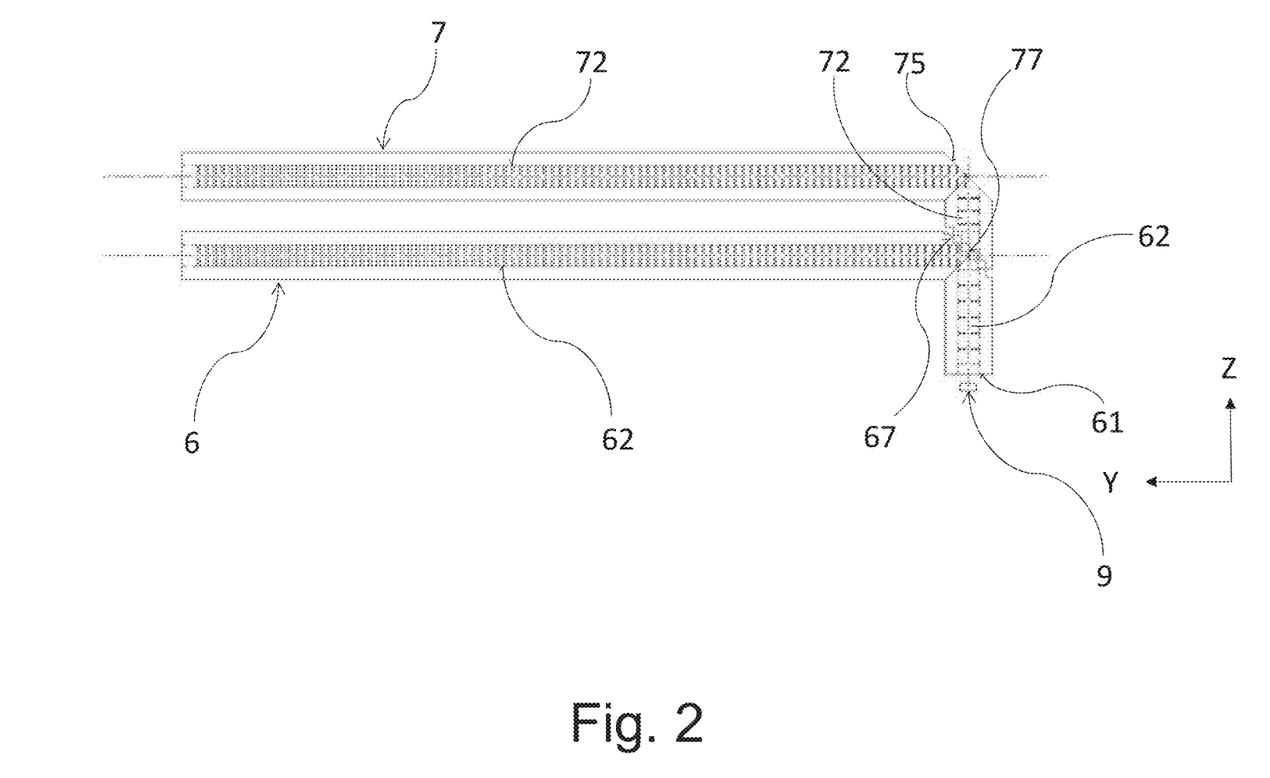
FIG. 2 is a view of the rear side of a light guide assembly of FIG. 1.
Figure 3:
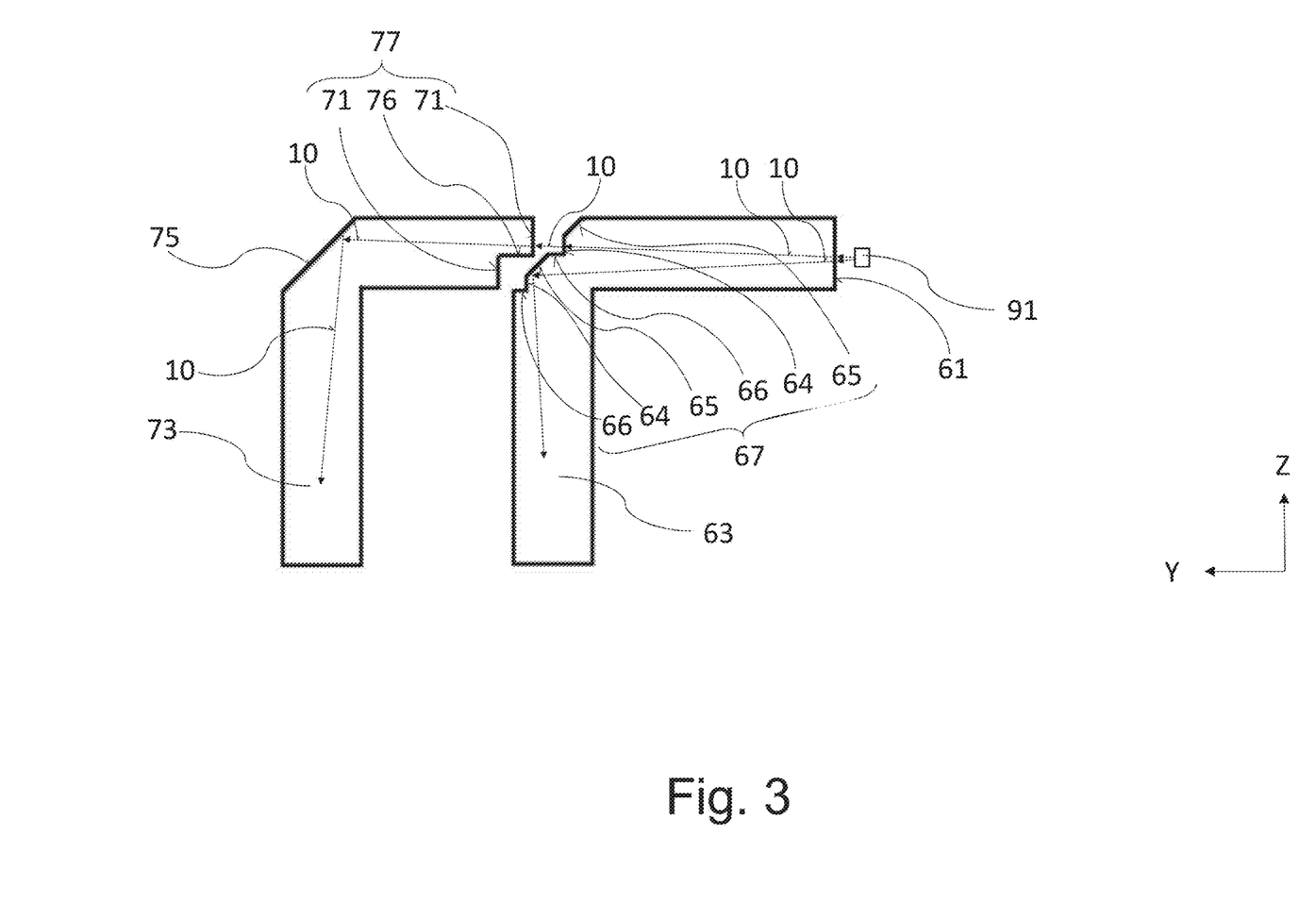
FIG. 3 is a detailed view of the stepped surfaces of the light guides of FIG. 1.
Figure 4:
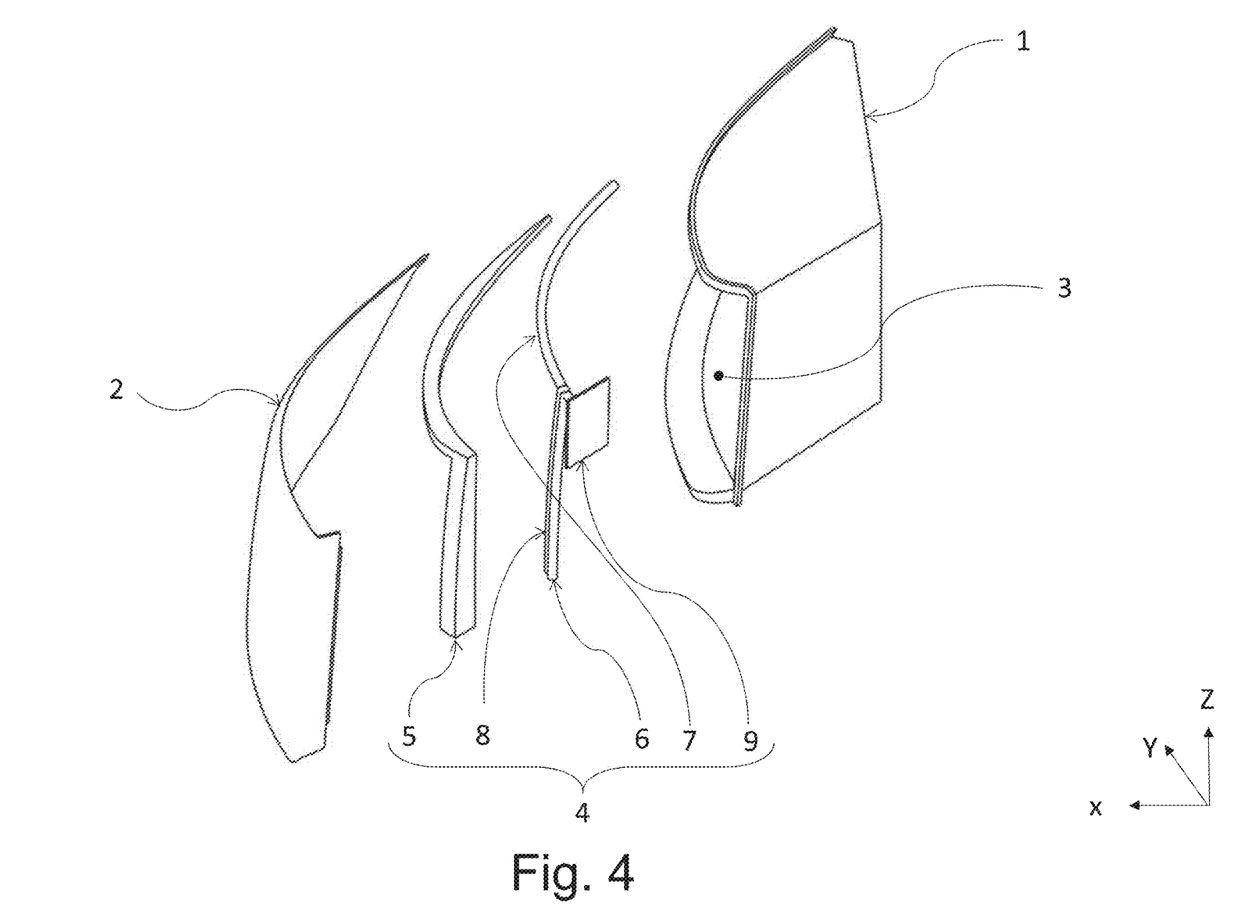
FIG. 4 is an exploded axonometric view of a second embodiment of the lighting device according to the invention.
Figure 5:
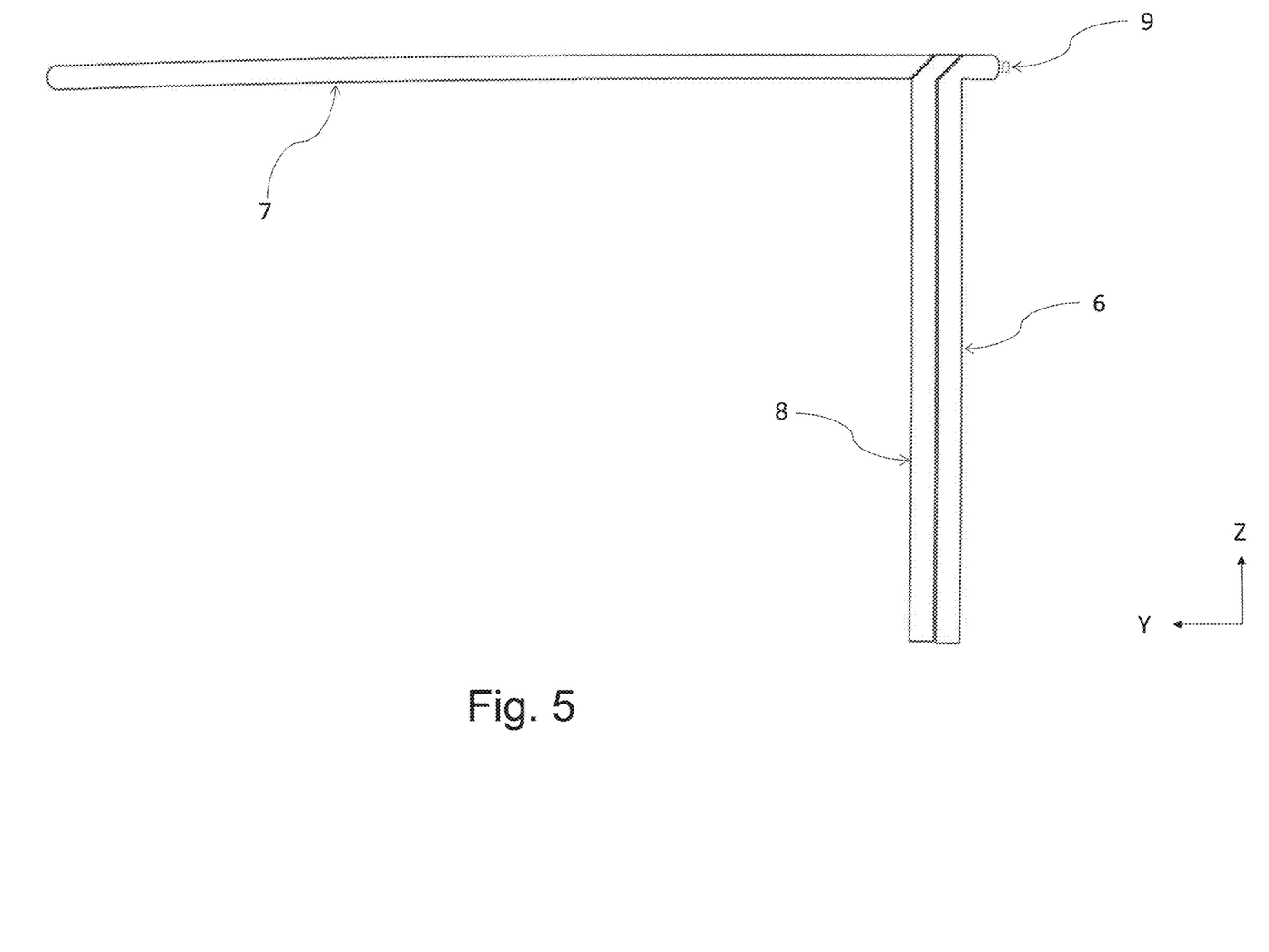
FIG. 5 is a view of the front side of the light guide assembly of FIG. 4.

FIGS. 1, 2 and 3 show a first exemplary embodiment of the light guiding optical system according to the invention. The optical unit 4 comprises a transparent optical element 5, for example a filter. In the direction away from the cover glass 2 towards the inner chamber 3, behind the transparent optical element 5 is arranged an assembly of two light guides 6, 7 which, in the embodiment shown, are situated next to each other. A light unit 9 having at least one light source is assigned to the inner light guide 6, whereby the outer light guide 7 is optically coupled to the inner light guide 6 in order to couple the light emitted by the light unit 9 through the inner light guide 6.

The inner light guide 6 is realized as a linearly shaped light guide which is adapted to couple the light into its internal structure via an input surface 61, oriented against at least one light source 91 of the light unit 9. The inner light guide 6 is further provided with a rear decoupling surface 62 designed to direct the light rays 10 from the light source 91 to the front output surface 63 of the inner light guide 6 for the output of the light rays 10 guided by the inner light guide 6 out of the light guide 6 towards the cover glass 2. In the exemplary embodiment shown, the inner light guide 6 is provided in its central part with a transition surface 67, which is broken and stepped in shape, and which is divided into a plurality of smaller surfaces, some of which are decoupling surfaces 64 and some are reflective surfaces 65, or, optionally, some surfaces from the system of smaller surfaces are formed by inactive surfaces 66, which, however, are not indispensable from the point for the invention functioning, but in some embodiments of the invention, they are beneficial to the overall effectiveness of the invention. In terms of homogeneity of the light rays 10 it is advantageous if the individual types of surfaces 64, 65 and optionally 66 are arranged alternately within the area of the transition surface 67. The decoupling surfaces 64 are adapted to decouple the incident light rays 10 from the inner light guide 6 towards the input surface 77 of the outer light guide 7. The reflective surfaces 65 are adapted for total reflection of the incident light rays 10 and for directing the light rays 10 in the internal structure of the inner light guide 6. The optional inactive surfaces 66 are adapted to form inactive or less luminous active parts of the transition surface 67 and to make flexible adjustments to the width and/or height of the inner light guide 6 and/or to ensure uniform distribution of the light flux in the inner light guide 6. In an unillustrated exemplary embodiment, the transition surface 67 of the inner light guide 6 is made without the inactive surfaces 66.

The outer light guide 7 is realized as a linearly shaped light guide which is provided with a stepped input surface 77 oriented towards the transition surface 67 of at least one inner light guide 6. The input surface 77 comprises stepped coupling surfaces 71 and, optionally, also inactive surfaces 76, whereby the coupling surfaces 71 are adapted to couple the light rays 10 emitted by the light-emitting surfaces 64 of the transition surface 67 of the inner light guide 6 and the optional inactive surfaces 76 are adapted to form inactive or less luminous active parts of the input surface 77 of the outer light guide 7 and, where appropriate, also to make flexible adjustments to the width and/or height of the outer light guide 7 and/or to distribute uniformly the light flux in the outer light guide 7. By means of the rear decoupling surface 72 the outer light guide 7 is adapted to direct the light rays 10 to the front output surface 73 for the output of the light rays 10 guided by the outer light guide 7 out of the outer light guide 7 and towards the cover glass 2. The outer light guide 7 is further provided in its central part with a reflective surface 75 adapted for total reflection of the incident light rays 10 and for directing the light rays 10 in the internal structure of the outer light guide 7.

FIGS. 4 to 7 show a second example of embodiment according to the invention, which comprises an assembly of three light guides 6, 7, 8, which are situated next to each other, where the central light guide 8 is arranged between the inner light guide 6 and the outer light guide 7.

The inner light guide 6 is provided with an input surface 61 to couple the light rays 10 emitted by the light unit 9 and is further provided with a transition surface 67 with reflective surfaces 65 for directing a portion of the light rays 10 in the internal structure of the inner light guide 6, whereby the transition surface 67 further comprises decoupling surfaces 64 for decoupling a portion of the light rays 10 from the inner light guide 6 towards the input surface 87 of the central light guide 8. In the exemplary embodiment shown, the transition surface 67 of the inner light guide 6 comprises also inactive surfaces 66, which are adapted to form inactive or less luminous active surfaces of the transition surface 67 and to make flexible adjustments to the width and/or height of the inner light guide 6 and/or to distribute uniformly the light flux in the inner light guide 6. In an unillustrated exemplary embodiment, the transition surface 67 of the inner light guide 6 is realized without the inactive surfaces 66.

The central light guide 8 is provided with an input surface 87 to couple the light rays 10 which are decoupled from the inner light guide 6 by the decoupling surfaces 64. The input surface 87 of the central light guide 8 comprises stepped coupling surfaces 81 and, optionally, also inactive surfaces 86, whereby the coupling surfaces 81 are adapted to couple the light rays 10 emitted by the decoupling surfaces 64 of the transition surface 67 of the inner light guide 6. The optional inactive surfaces 86 are adapted to form inactive or less luminous active parts of the input surface 87 and/or to make flexible adjustments to the width and/or height of the central light guide 8 and/or to distribute uniformly the light flux in the central light guide 8. The central light guide 8 is further provided with a transition surface 88, which is within its area provided with reflective surfaces 85 for directing the light rays 10 in the internal structure of the central light guide 8 and is further provided with decoupling surfaces 84 to decouple the light rays 10 from the central light guide 8 towards the input surface 77 of the outer light guide 7. Alternatively, the transition surface 88 is also provided with inactive surfaces 86, which are adapted to form inactive or less luminous active parts of the transition surface 88 and to adjust flexibly the width and/or height of the inner light guide 8 and/or to ensure uniform distribution of the light flux in the inner of the light guide 8. In an unillustrated exemplary embodiment, the transition surface 88 of the central light guide 8 is realized without the inactive surfaces 86. The central light guide 8 is further provided with a rear decoupling surface 82 adapted to direct the light rays 10 to the front output surface 83 for the output of the light rays 10 guided by the central light guide 8 from the central light guide 8 towards the cover glass 2.

The outer light guide 7 is provided with a stepped input surface 77 to connect the light rays 10 emitted by the decoupling surfaces 84 of the central light guide 8, whereby the input surface 77 of the outer light guide 7 comprises stepped coupling surfaces 71 and, optionally, inactive surfaces 76. The outer light guide 7 is further provided in its central part with a reflective surface 75 adapted for total reflection of the incident light rays 10 and for directing the light rays 10 in the internal structure of the outer light guide 7.

Figure 6:
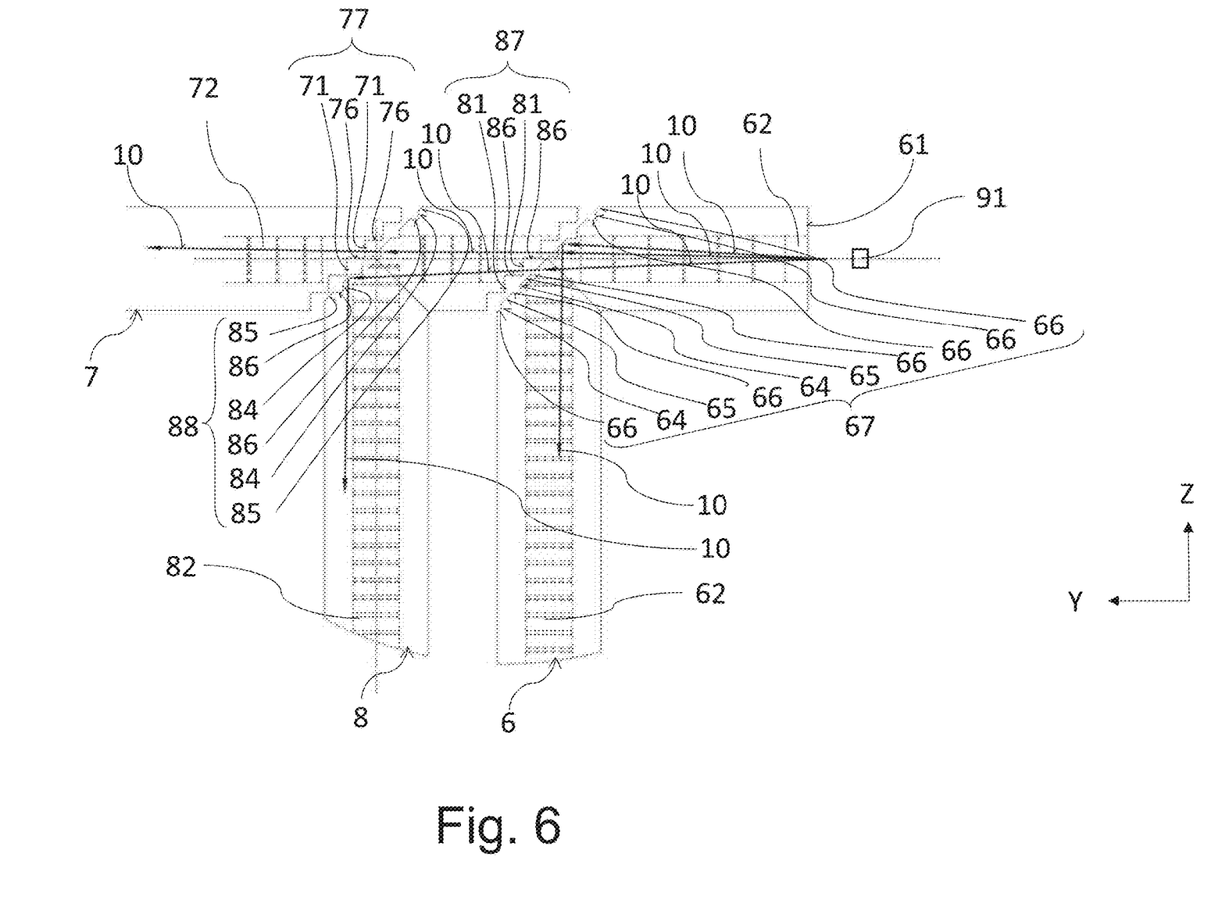
FIG. 6 is a detailed view of the stepped shaped surfaces of the light guides of FIG. 4 with the indicated light path from the light source.
Figure 7:
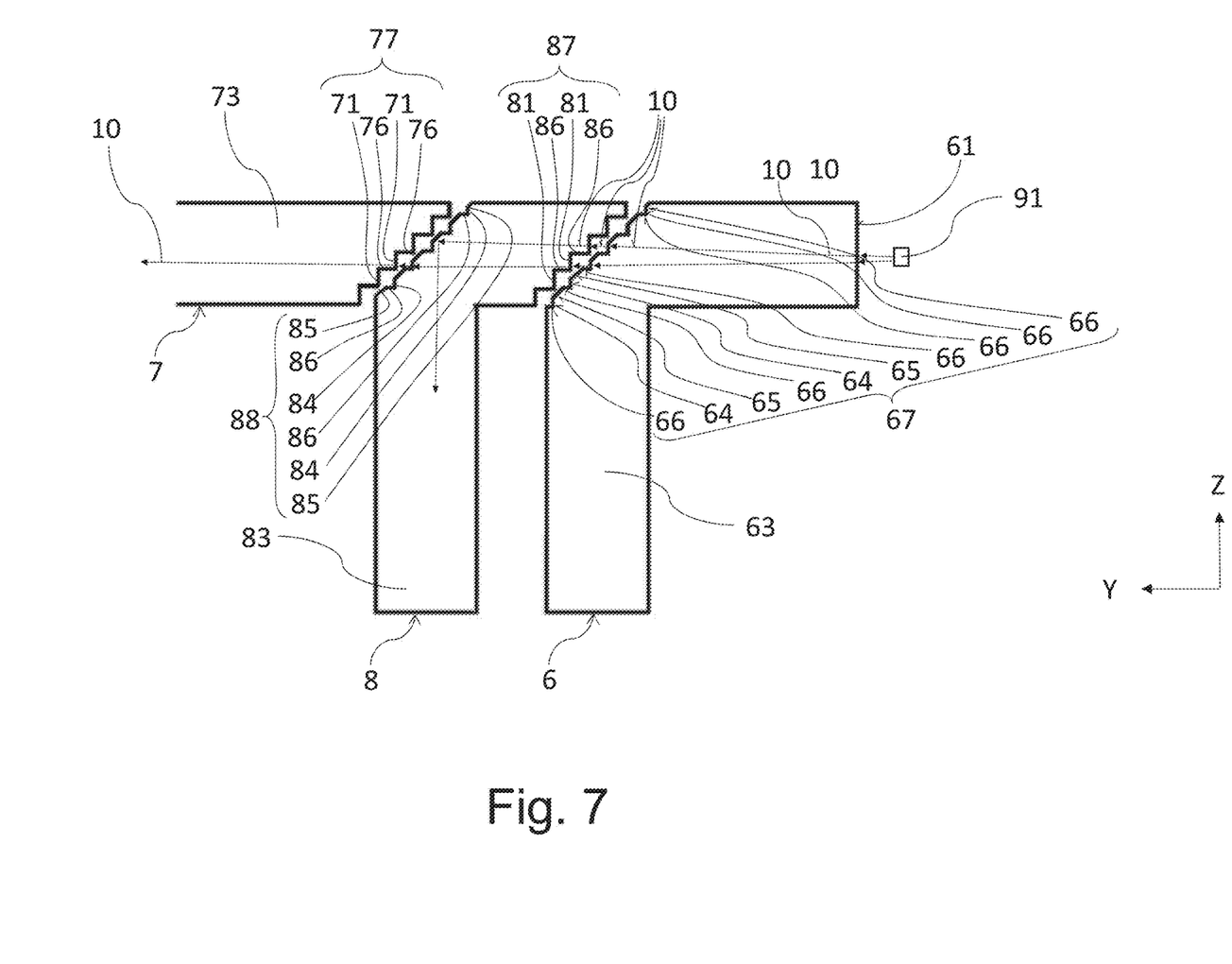
FIG. 7 is a detailed view of the stepped shaped surfaces of the light guides and their interconnection.
Figure 8:
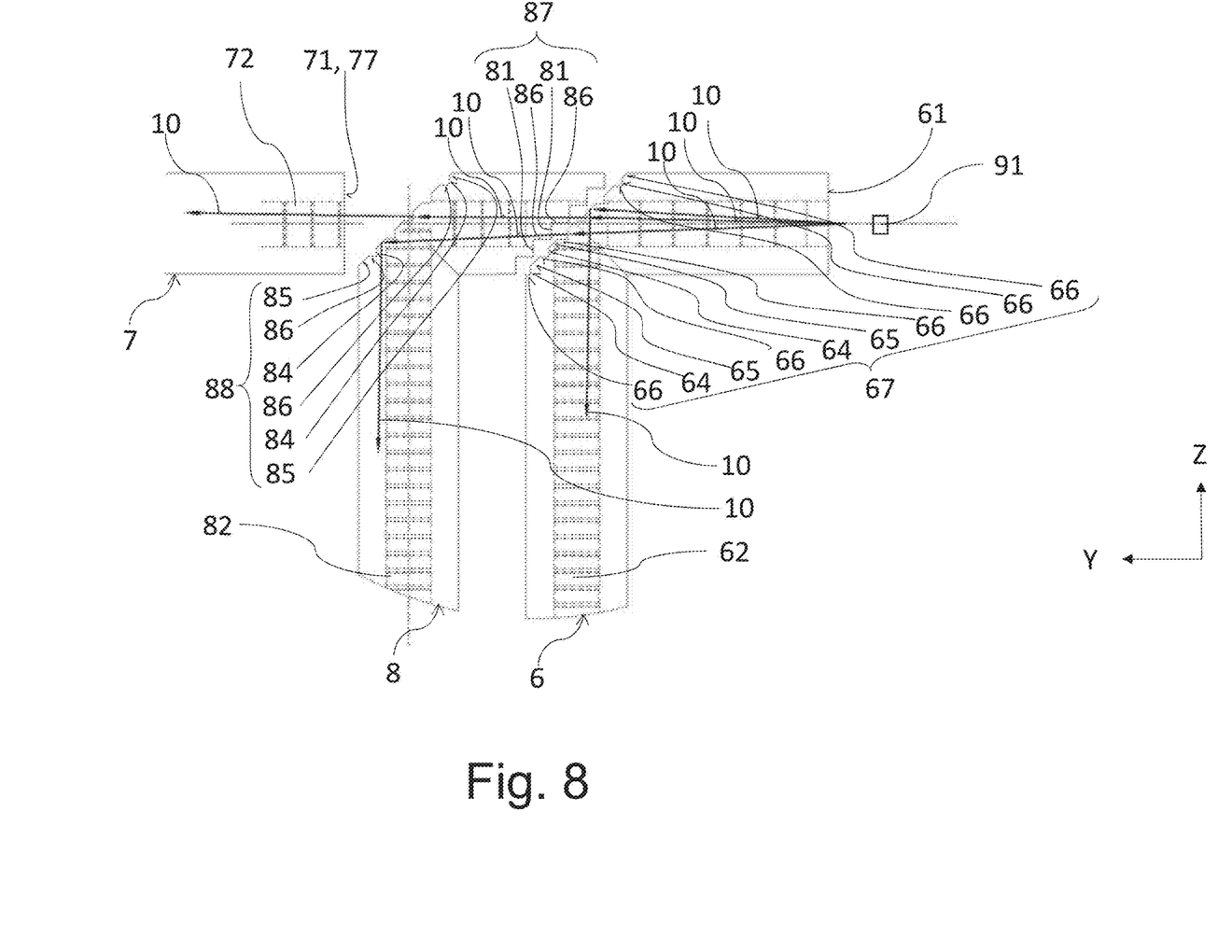
FIG. 8 is a variant of the embodiment of FIG. 6 wherein the input surface of the outer light guide is in the form of a single continuous coupling surface.

In the embodiment in FIG. 8 there is a modification of the embodiment of FIG. 6 consisting in that the input surface 77 of the outer light guide 7 is formed by one continuous coupling surface 71, which may be suitably inclined or adapted in its shape to couple light to the light guide 7.

In an unillustrated exemplary embodiment, the number of the central light guides 8 is higher than 1, whereby the central light guides 8 are provided with an input surface 87 with stepped coupling surfaces 81 and, optionally, with inactive surfaces 86 to couple the light rays 10 from the light guide 6 or 8 situated in front of them, and the central light guides 8 are further provided with a transition surface 88 with reflective surfaces 85 and decoupling surfaces 84 to decouple the light rays 10 from the respective central light guide 8 into the light guide 8 or 7 arranged behind them and, optionally, also with the inactive surfaces 86.

It follows from the above-mentioned facts that by means of the input surfaces 77 and 87 the outer light guide 7 and the central light guides 8 are adapted to couple the light rays 10 and, where appropriate, to adjust the amount and area distribution of the light rays 10 coupled from the light guides 6 and/or 8 located in front of them in the direction of the light ray 10 travel, whereby by means of the transition surfaces 67, 88 the inner light guide 6 and, optionally, the central light guide 8 or central light guides 8 are adapted to direct the light rays 10 in the light guides 6, 8, and to decouple the light rays 10 from the light guides 6, 8 to the next light guide 8 or 7 arranged behind them and, where appropriate, they are also adapted to adjust the amount and area distribution of the reflected and/or decoupled light rays 10.

Between the individual transition surfaces 67, 88 of the inner light guide 6 situated opposite each other or the optional central light guide 8 and the input surfaces 77, 87 of the outer light guide 7 or the optional central light guide 8 there are either air gaps and/or these surfaces 67, 88 and 77, 87 abut against each other and/or they are connected with optical sealant, etc.

It is clear from the above that the transition surfaces 67, 88 of the inner light guide 6 and of the optional central light guide 8 in principle comprise at least one decoupling surface 64, 84, at least one reflective surface 65, 85 and, optionally, also at least one inactive surface 66, 86, whereby the input surfaces 77, 87 of the outer light guide 7 and of the optional central light guide 8 in principle comprise at least one coupling surface 71, 81 and, where appropriate, also at least one inactive surface 76, 86 and the end light guide, here the outer light guide 7 is preferably provided with a reflective surface 75. By means of area distribution of different types of these specific surfaces 64, 84, 65, 85, 66, 86, 71, 81, 76, 86 in the total area of the input surface and/or the transition surface 67, 88, 77, 87 of each light guide 6, 7, 8, and especially by means of the mutual ratio of the areas of different types of these specific surfaces 64, 84, 65, 85, 66, 86, 71, 81, 76, 86 within the input surface and/or transition surface 67, 88, 77, 87 of each light guide 6, 7, 8 it is possible to influence the light homogeneity and robustness in the individual light guides 6, 7, 8, the ratio of reflected, transmitted and, where appropriate, dimmed light 10 in the individual light guides 6, 7, 8 etc.

In principle, the decoupling surfaces 64, 84 and the coupling surfaces 71, 81 are arranged transversely to the direction of the light ray 10 travel, the reflective surfaces 65, 85 are situated obliquely to the direction of the light ray 10 travel and the optional inactive surfaces 66, 86 are situated in the direction of the light ray 10 travel.

LIST OF REFERENCES

1 carrier case
2 cover
3 chamber
4 optical unit
5 transparent optical element
6 inner light guide
61 input surface
62 decoupling surface
63 output surface
64 decoupling surfaces
65 reflective surface
66 inactive surface
67 transition surface
7 outer light guide
71 coupling surface
73 output surface
75 reflective surface
76 inactive surface
77 input surface
8 central light guide
81 coupling surface
83 output surface
85 reflective surface
86 inactive surface
87 input surface
88 transition surface
9 light unit
91 light source
10 light ray
x, y, z direction of Cartesian coordinate system

The invention claimed is:
1. A light guiding optical system comprising:
a light unit having at least one source of light for creating light rays; and
at least two light guides including an inner light guide and a coupling light guide, the inner light guide having an input surface disposed opposite the light unit for receiving light rays and a stepped transition surface, the stepped transition surface including at least one decoupling surface and at least one reflective surface, the coupling light guide having an input surface with at least one coupling surface, the stepped transition surface being disposed opposite the input surface of the coupling light guide.
2. The light guiding optical system according to claim 1, wherein the coupling light guide includes an outer light guide, and the stepped transition surface of the inner light guide is disposed opposite an input surface of the outer light guide.

3. The light guiding optical system according to claim 1, wherein the coupling light guide includes a central light guide, and the stepped transition surface of the inner light guide is disposed opposite an input surface of the central light guide; and the light guiding optical system further including at least one further coupling light guide having an input surface, the central light guide having a transition surface with at least one reflective surface and at least one decoupling surface for decoupling light rays received from the central light guide towards the input surface of the further coupling light guide.

4. The light guiding optical system according to claim 3, wherein the further coupling light guide is one of a centrally-located light guide or a final light guide in a group of light guides beginning after the light unit.

5. The light guiding optical system according to claim 3, wherein at least one of the stepped transition surface of the inner light guide and the transition surface of the central light guide includes at least one inactive surface.

6. The light guiding optical system according to claim 2, wherein the outer light guide includes a reflective surface for total reflection of light rays received from the inner light guide and for directing the reflected light rays in an internal structure of the outer light guide.

7. The light guiding optical system according to claim 3, wherein the input surface of the central light guide includes at least one coupling surface and at least one inactive surface.

8. The light guiding optical system according to claim 1, wherein air gaps are located between respective opposing surfaces of the inner light guide and the coupling light guide.

9. The light guiding optical system according to claim 1, wherein respective opposing surfaces of the inner light guide and the coupling light guide abut against each other.

10. The light guiding optical system according to claim 1, wherein an optical sealant connects respective opposing surfaces of the inner light guide and the coupling light guide to each other.

11. The light guiding optical system according to claim 1, wherein the decoupling surface and the coupling surface are disposed substantially transversely to a direction of travel of the light rays, and the reflective surface is disposed substantially obliquely to the direction of travel of the light rays.

12. The light guiding optical system according to claim 11, wherein the stepped transition surface includes inactive surfaces disposed substantially parallel to the direction of travel of the light rays.

13. The light guiding optical system according to claim 1, wherein the transition surface of the inner light guide includes a plurality of the decoupling surfaces and a plurality of the reflective surfaces, and wherein the input surface of the coupling light guide includes a plurality of coupling surfaces and a plurality of inactive surfaces.

14. The light guiding optical system according to claim 13, wherein the transition surface of the inner light guide further includes a plurality of inactive surfaces.

15. The light guiding optical system according to claim 1, wherein a ratio of a total area of at least one of the decoupling surface and the reflective surface to the total area of the coupling surface corresponds to a desired amount of light and a desired light homogeneity in the inner light guide and the coupling light guide.

16. The light guiding optical system according to claim 5, wherein a ratio of a total area of the inactive surface to the total area of the coupling surface corresponds to a desired amount of light and a desired light homogeneity in the inner light guide and the coupling light guide.

* * * * *